United States Patent [19]

Geschwender

[11] 4,076,880

[45] Feb. 28, 1978

[54] MASTIC COMPOSITION AND COMPOSITE STRUCTURAL PANELS FORMED THEREFROM

[75] Inventor: Robert C. Geschwender, Lincoln, Nebr.

[73] Assignee: Lancaster Research and Development Corporation, Lincoln, Nebr.

[21] Appl. No.: 573,129

[22] Filed: Apr. 30, 1975

Related U.S. Application Data

[63] Continuation of Ser. No. 381,073, Jul. 20, 1973, abandoned.

[51] Int. Cl.[2] .......... B32B 3/12

[52] U.S. Cl. .......... 428/116; 52/618; 428/443; 428/73; 428/538; 428/118; 428/119; 428/920; 260/2.5 B

[58] Field of Search .......... 428/72, 73, 116–120, 428/251, 271, 443; 156/197; 52/615, 618

[56] References Cited

U.S. PATENT DOCUMENTS

| | | | |
|---|---|---|---|
| 2,633,439 | 3/1953 | Konstandt | 52/615 X |
| 2,892,339 | 6/1959 | Flower et al. | 52/615 X |
| 3,021,291 | 2/1962 | Thiessen | 260/2.5 |
| 3,106,503 | 10/1963 | Randall et al. | 428/119 X |
| 3,166,149 | 1/1965 | Hulse et al. | 181/33 R |
| 3,249,659 | 5/1966 | Voelker | 428/117 X |
| 3,598,672 | 8/1971 | Heller | 428/116 X |
| 3,630,820 | 12/1971 | Leach | 428/402 X |
| 3,673,058 | 6/1972 | Jackson et al. | 428/118 |
| 3,697,366 | 10/1972 | Harlock et al. | 156/42 X |
| 3,753,843 | 8/1973 | Hutchison | 428/116 |

FOREIGN PATENT DOCUMENTS

| | | |
|---|---|---|
| 1,138,637 | 1/1969 | United Kingdom. |
| 1,177,784 | 1/1970 | United Kingdom. |

*Primary Examiner*—George F. Lesmes
*Assistant Examiner*—Henry F. Epstein
*Attorney, Agent, or Firm*—Koenig, Senniger, Powers and Leavitt

[57] ABSTRACT

A mastic composition formed of a substantially homogeneous imporous mixture of a predetermined volume of low-density expanded closed-cell synthetic resin beads and a slurry prepared from calcined gypsum and water wherein the interstitial volume of the expanded beads is not substantially less than the volume of slurry. The substantially homogeneous mixture is self-adhering as a thick layer on an inverted smooth surface and yet separable therefrom as an integral layer, the mastic composition setting to a hard, strong, dimensionally stable, heat- and sound-retardant material. Methods of mixing mastic compositions, and composite structural panels utilizing mastic compositions as well as the methods and apparatus for forming such panels are also disclosed.

7 Claims, 19 Drawing Figures

$H_2O$
CALCINED GYPSUM
SLURRY FORMATION
EXPANDED BEADS
FIBERGLASS
MIXER
MASTIC COMPOSITION 1
3
5
5a
7
9
9a
11
11a
13
13a
15
15a
17
17a
19
21
23
27
33
33a
35
35a
38

5
29
7
5a
37
35
31

5
13
38
35
39
41
11
41
45
49
5a
43
47
5
39
11a
13a
35a
47a 38
11
13
47
35
39
41
49
5a
49a
39
11a
47a
35a
13a
41

43
38
11a
49a
51
39
13a
47a 43
38
49a
51
11a
41
13a
47a
39

57
53
9
55
51
59
11
13

55
57
11
9
13
59
51
53

13
13
39
41
61
35
5a
11
41
13
39
11a
43
13a
65
35a
47a 65
39
41
47
13
11
35
61
49
43
5a
49a
61a
47a
35a
13a
11a
39
41

5a
67
77
103
79
85
75
79
83
73
83
81
79
85
81
71

21
17
17a
67
103
71
87
89
91
11a
9a
13a
15a
11
77
75
73
93
85
83
81
97
95

105
18
13
73
39
41
35
11
71
81
41
39
49
45
99
18
47
11a
13a
35a
47a
101

105
47
13
11
99
35
39
41
49
81
49
43

73
71
49a
49a
41
39
35a
47a
101
11a 38,65 OR 105
11
13
13
11
5
5
13a
11a
107
109
107
11a
13a

MASTIC COMPOSITION AND COMPOSITE STRUCTURAL PANELS FORMED THEREFROM

This is a continuation, of application Serial No. 381,073, filed July 20, 1973, now abandoned.

BACKGROUND OF THE INVENTION

The present invention relates generally to structural or building components and in particular to mastic compositions, methods of forming same, and composite structural panels utilizing mastic compositions as well as methods and apparatus for forming such panels.

In the past, various mastic compositions, methods of forming them, and composite structural panels utilizing mastic compositions as well as methods and apparatus for forming composite structural panels have been disclosed, but while each had certain advantageous features, none contained all or even most of the features desirable for forming or use of the composite panels as a structural or building component.

U.S. Pat. No. 3,021,291 discloses mixing expandable polystyrene beads with a cementitious slurry, using a gas to form a cellular material with voids therein, and, after setting or curing, heating to expand the beads which are intended to fill voids. U.S. Pat. Nos. 3,630,820 and 3,697,366 each disclose that closed-cell expanded polystyrene beads, when mixed in a cementitious slurry, rise or float to the top of the slurry so as to make it impossible to attain a homogeneous mixture. In these disclosures, expanded polystyrene beads are shredded to open the cells of the normally closed-cell beads thereby to permit them to abosrb slurry into their shredded open cells which overcomes the flotation problem and ensures a homogeneous mix of shredded open-cell beads with the slurry. U.S. Pat. No. 3,598,672 describes mixing expanded polystyrene beads with an epoxy resin, admixing glass fibers which adhere to the surfaces of the beads, subjecting this mixture to pressure to effect setting thereof and then separating the beads coated with glass fibers for use in forming other products.

U.S. Pat. No. 2,633,439 discloses a composite structural panel with a core of spiral wood shavings and gypsum plaster facing layers or walls with the edges of the shavings embedded in the opposite wall surfaces, but each of the spiral wood shavings has a central aperture to provide free passage of air between cells and to the exterior of the panel. U.S. Pat. No. 2,892,339 shows a honeycomb core structural panel formed in its entirety of molded gypsum material. One face and the honeycomb structure are integrally formed, then cured, and then pressed into the other face to form the panel. One notch is provided in one wall edge of each individual honeycomb cell to permit the circulation of air throughout the core of the assembled honeycomb structure, in which wire mesh and/or fibers may be used for reinforcement. U.S. Pat. No. 3,249,659 discloses the application of a thin layer of foam-forming polyurethane resin to opposite surfaces of two webs of paper facing material which are brought into contact with opposite faces of a honeycomb core and the assembly then heated to effect foaming of the resin. Holes are provided in the honeycomb walls interconnecting each individual honeycomb cell to permit air circulation throughout the entire honeycomb core.

SUMMARY OF THE INVENTION

Among the several objects of the present invention may be noted the provision of mastic compositions with properties and characteristics that are highly advantageous in forming structural components such as panels; the provision of mastic compositions which are self-adhering as a thick layer on an inverted smooth surface and yet are separable as an integral layer and will set to a hard, strong dimensionally stable, heat and sound resistant material; the provision of methods of forming such mastic compositions which are simple and economical; the provision of composite structural panels that are lighter in weight and yet have a structural strength exceeding that of conventional panels; the provision of such panels that have superior thermal insulating and sound-deadening properties and closely controlled and uniform total thickness dimensions and surface flatness characteristics; the provision of composite structural panels having facial hardness, surface porosity and odor characteristics comparable to conventional structural drywall; the provision of composite structural panels which can be provided with a wide variety of architectural finishes; the provision of composite structural panels with tensile, compressive and shear strengths at least equal to or in excess of conventional drywall; the provision of composite structural panels with thermal, sound, water and vapor transmission, and weathering resistance properties equal to or exceeding those of conventional drywall; the provision of composite structural panels which have excellent moduli of rupture and elasticity; the provision of such structural panels which may be easily fabricated, worked, machined such as by sawing, drilling or routing or the like, with either power or conventional hand tools; the provision of such structural panels which are dimensionally stable, and resist warping, distortion or creeping; the provision of composite structural panels which are resistant to handling damage and puncture, limiting such to the actual contact area of puncture and which have the ability to accept attachments, such as nails, screws or bolts without chipping or radial cracking; the provision of such panels which have excellent heat holding and acoustical properties and will, even when under stress, absorb and damp noise and vibrations; the provision of composite structural panels which are easily repaired and maintained and are resistant to joint damage; and the provision of apparatus and methods for fabricating such panels continuously and economically. Other objects and features will be in part apparent and in part pointed out hereinafter.

Briefly, a mastic composition of this invention comprises a substantially imporous homogeneous mixture of a predetermined volume of low-density expanded closed-cell synthetic resin beads and a slurry prepared from calcined gypsum and water. The interstitial volume of expanded beads is not substantially less than the volume of slurry. The mixture is self-adhering as a thick layer on an inverted smooth surface yet is separable therefrom as an integral layer and sets to a hard, strong, dimensionally stable, heat and sound retardant material. The invention also includes a method of forming such mastic compositions by mixng calcined gypsum and water to form a slurry and admixing in the slurry a volume of low-density expanded closed-cell synthetic resin beads having an interstitial volume not less than the volume of the slurry.

A method of making a composite structural panel of this invention comprises applying on a smooth support surface a layer of hardenable mastic composition comprising a homogeneous imporous mixture of low-density closed-cell expanded synthetic resin beads and a slurry prepared from calcined gypsum and water, concertedly inverting the support surface and its mastic composition layer which is self-adherent thereon, and pressing the mastic layer into a face of a honeycomb core with the mastic layer penetrating into each honeycomb cell and the support surface spaced from the one core face.

A composite structural panel of this invention comprises a cellular core having opposite faces with walls between each cell, the walls having opposite edges constituting the opposite core faces, and a layer of hardened imporous heat - and sound-retardant composition on each core face penetrating into each cell. The cell walls having openings between each cell and adjacent the opposite faces predetermining the penetration of the layers into the cells, the layers having penetrated generally to the point of closing the openings and thereby trapping air in the cells to limit such penetration.

Apparatus of this invention for making a composite structural panel comprises means for applying a layer of mastic composition onto a supporting surface, means for concertedly inverting the supporting surface and its layer, and means for pressing the layer while inverted into a face of a cellular core with the supporting surface spaced from the core face.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
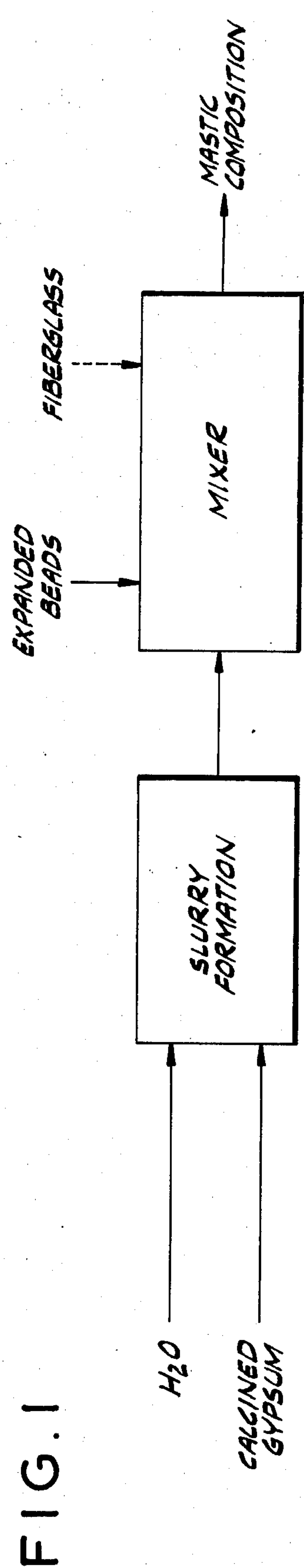
FIG. 1 is a flow diagram illustrating a method of this invention for forming a mastic composition of this invention.

Referring now to FIG. 1, there is shown a flow diagram illustrating a method of forming a mastic composition of this invention. In general, a slurry is prepared from calcined gypsum and water, and a volume of low-density expanded closed-cell synthetic resin beads, such as expanded polystyrene beads, which have an interstitial volume not substantially less than the volume of the slurry, is admixed to the slurry to form the mastic composition. Reinforcing fibers such as glass fibers, natural or synthetic fibers, metal chips, comminuted metal wire or the like, may also be admixed with the slurry and expanded beads replacing a portion of the expanded beads generally for the purpose of reinforcing the mastic composition and enhancing the adhering and flowability characteristics thereof, and the strength properties of the composition after setting. Alternately, reinforcing fibers may be added to the mastic composition.

This mastic composition has physical characteristics uniquely suitable for the manufacture of composite structural panels, although it also has other uses. For instance, inclusion of the expanded synthetic resin beads provides a relatively lightweight mastic composition, and the manner and quantities of mix provides a mastic composition which is readily workable an adapted for use in continuous manufacturing processes. In its mastic stage, the composition has the physical characteristics of being a substantially imporous and homogeneous mixture which is extrudable, easily spread or applied to a surface, and is self-adhering as a relatively thick layer on an inverted smooth surface yet separable therefrom as an integral layer. When the mastic composition sets up or dries, it provides a hard, strong, dimensionally stable, heat-and sound-resistant material which when utilized in the fabrication of composite structural panels, as described hereinafter, is capable of withstanding surprisingly high stresses in tension, compression and shear while providing a surface extremely accurate in flatness tolerance which is architecturally desirable for design, structural and construction purposes. Mastic compositions which exhibit these desirable physical characteristics are attainable within certain weight and volume ranges of the slurry, expanded synthetic resin beads and, if desired, glass fibers. It has been found that these ranges are important in the forming of mastic compositions having the desirable physical characteristics and qualities previously mentioned. If the volume of the slurry and expanded synthetic resin beads are substantially outside of these ranges, the mastic composition is either too thick to mix, work or apply onto a surface or else so thin or runny that the expanded beads float on the slurry and a heterogeneous unusable mixture results.

In the method of forming the mastic composition, a slurry is prepared by mixing between about 55% to about 65% by weight of calcined gypsum (plaster of Paris) with between about 35% to about 45% by weight of water. To the resulting thick slurry is admixed a predetermined volume of low-density expanded closed-cell synthetic resin beads, such as expanded polystyrene beads, which, for example, have a typical size range of 1/16 inches to about ⅛ inches. The predetermined volume of expanded beads admixed with the slurry is that which has an interstitial volume not substantially less than the volume of the slurry and wherein the volume of the slurry is not more than about 25% in excess of the interstitial volume of the expanded beads. The interstitial volume is the volume of the unoccupied space remaining in any given amount of the dry beads at atmospheric pressures. By way of illustration, an example of a desirable mastic composition within the above-mentioned ranges and based on volume of expanded beads to slurry is about 60% by volume of beads to about 40% by volume of slurry. Also by way of illustration, an example of a desirable mixture of the mastic composition within the above-mentioned ranges is obtained by admixing about 2 parts by weight of expanded beads in a slurry prepared from about 25 parts by weight of calcined gypsum and about 17 parts by weight of water. When so prepared, a mastic composition is formed which is a substantially imporous and homogeneous mixture having physical characteristics of being self-adhering as a thick layer on an inverted smooth surface and yet being separable therefrom as an integral layer. When this mastic composition sets up or dries (typical setting time is about 20 minutes at normal ambient conditions), it becomes a hard, strong, dimensionally stable, heat-and sound-resistant material which is relatively light in weight.

If glass or other reinforcing fibers are included in the expanded bead-slurry mixture, about 2% by weight is admixed, and the glass fibers range in size from about 1 inch to about 2 inches in length and from about 0.005 inches to about 0.015 inches in diameter. When glass fibers are admixed with the expanded bead-slurry mixture, a portion of expanded beads is replaced by a substantially equal weight of glass fibers. The interstitial volume of such a mastic composition is that of a weight of expanded beads which is substantially equal to the total weight of the expanded beads and fiber glass. On a volumetric basis the reinforcing fiber content may be between about 1%–5% of the total weight of the mastic composition.

Due in all probability to capillary action principles and surface tension effects the ratios of components and the sequence of mixing, the large volume of expanded beads will quickly and easily mix with the slurry rather than float and clump. The slurry is retained within the interstices of the expanded beads or at least does not separate, even though slurry volume is somewhat in excess of the interstitial volume of the beads. Further, as noted above, if a portion of the expanded beads is replaced by a substantially equal weight of glass fibers within the range given, the interstitial volume remains substantially the same as that before a portion of the beads were removed, and substantially the same volume of slurry is retained without significant separation. The mastic composition is easily handled and will form layers of uniform thickness and has the property of being self-adhering on a smooth inverted surface but is easily separable therefrom as a smooth integral layer.

Figure 2:
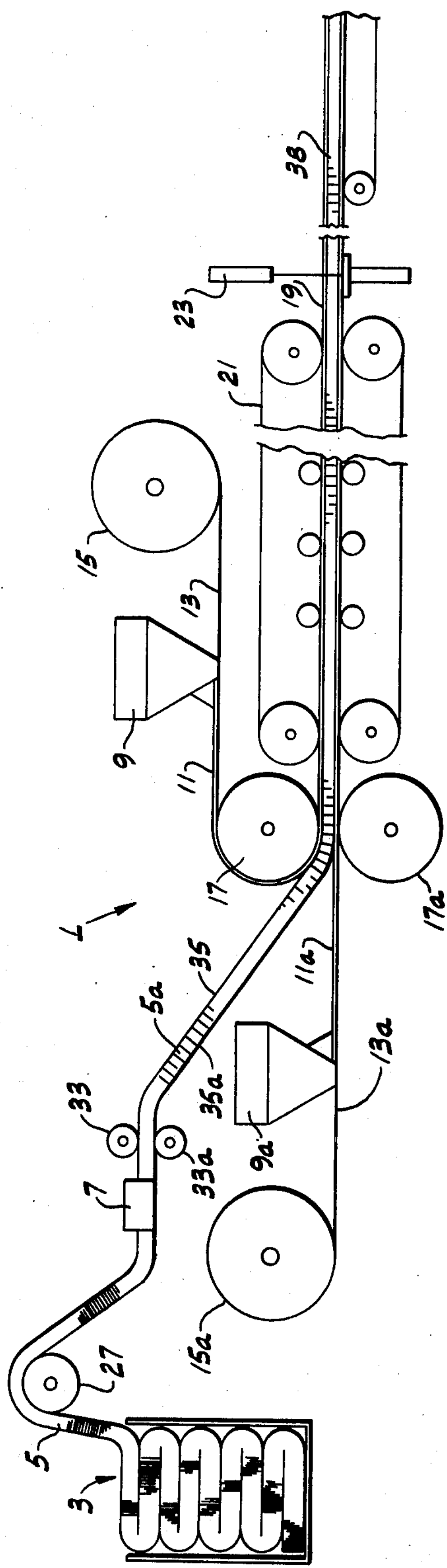
FIG. 2 is a schematic illustration of apparatus of this invention for forming composite structural panels utilizing the mastic composition of this invention.

Referring now to FIG. 2, a straight line manufacturing or production line or process is shown for continuously forming composite structural panel utilizing the mastic compositions previously discussed as opposite facing layers in conjunction with a core of paper honeycomb material.

There is shown generally at 1 a composite structural panel fabricating or production line apparatus comprising a source 3 from which is continuously supplied unexpanded or compacted honeycomb core material 5, of kraft paper or asbestos or the like, through an expander 7 therefor, and a pair of upper and lower mastic composition batchers and appliers **9,9*a* for applying layers of a mastic composition 11,11*a* onto two webs 13,13*a* of facing material of kraft paper, or the like, supplied from separate roll supplies or sources 15,15*a* thereof. The paper webs are trained around a pair of pressing rolls 17,17*a* which urge their mastic layers 11,11*a* into engagement with the upper and lower faces of expanded honeycomb core 5*a* to continuously form a composite structural panel 19 as it moves through a compression conveyor 21 to a cutoff device 23** for severing the panel into desired lengths.

Figure 3:
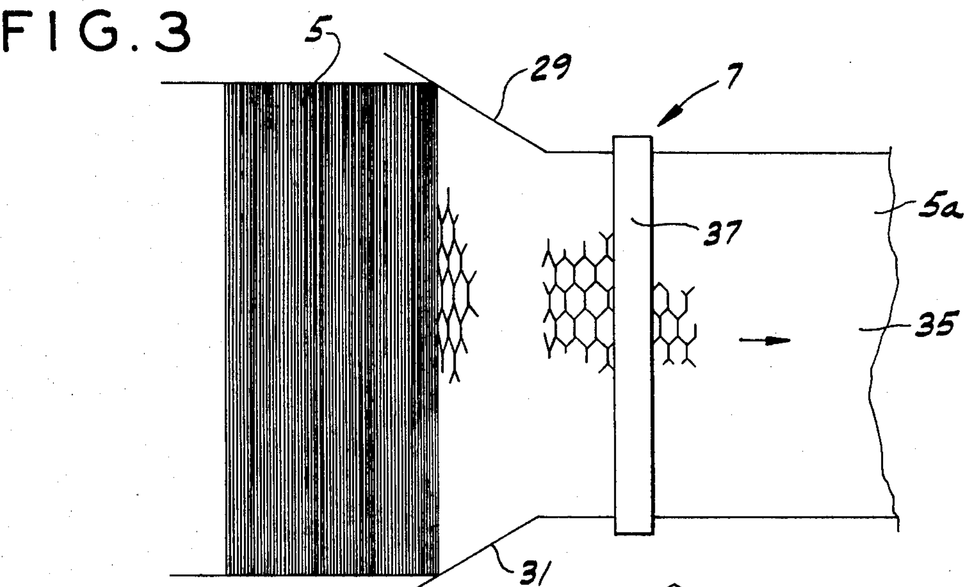
FIG. 3 is a fragmentary plan view showing a honeycomb expander used in the apparatus of FIG. 2.

More particularly, continuous honeycomb compaction 5, as shown also in FIG. 3, is supplied from honeycomb source 3 by a delivery roll 27 to an expander 7 having a pair of converging sidewalls 29,31 which engage opposite sides of the honeycomb compaction expanding the cells to form expanded honeycomb material **5*a* a desired width as it is drawn through the expander by a pair of expanding rolls 33,33*a* which are drivingly engaged with opposite faces 35,35*a* of continuous honeycomb core 5*a*. A brake bar 37 of expander 7 is biased into engagement with core face 35 to assist in controlling the expansion of the honeycomb material to a predetermined opencell state as it is drawn through expander 7 by expansion rolls 33,33*a* and fed to pressing rolls 17,17*a*. Expanded honeycomb core 5*a* is drawn from rolls 33,33*a* down a chute (not shown) by pressing rolls 17,17*a*. As these rolls 17,17*a* draw the facing material 13,13*a* from supply rolls 15,15*a* and beneath appliers 9,9*a*, relatively thick mastic composition layers 11,11*a* are spread on the smooth upper surface thereof. These batcher or mixer-applicators may comprise apparatus of the type used to mix and extrude bread dough. Lower web 13*a* and its layer 11*a* are advanced substantially in straight line flow through pressing rolls 17,17*a* where lower mastic layer 11*a* is pressed into lower core face 35*a*. However, the upper web of facing material 13 and upper mastic layer 11 are inverted as they move through an arc of approximately 180° about the periphery of pressing roll 17 to a position wherein upper mastic layer 11 is opposite lower mastic layer 11*a* and such layers are now disposed between facing material 13,13*a*. In its inverted position, upper mastic layer 11 is pressed into upper core face 35 by pressing roll 17 substantially simultaneously with the pressing of lower mastic layer 11*a* into lower core face 35*a*. Engagement of mastic layers 11,11*a* with core faces 35,35*a* continuously forms composite structural panel 19 as the superposed layers of paper facing, mastic layers and honeycomb core move from pressing rolls 17,17*a* through compression conveyor 21. As is well known in the art, compression conveyor 21 maintains even pressure against the webs 13,13***a* and mastic layers 11,11*a* while the mastic composition sets or dries to the point that it is substantially dimensionally stable and self-supporting. If desired, heating means (not shown) may be used to accelerate drying of mastic layers 11,11*a* as panel 19 passes through conveyor 21. Conveyor 21 transports panel 19 to cut-off device 23 which automatically severs continuous panel 19 into predetermined desired lengths thereby to form individual composite structural panels or segments 38. The mastic composition may be mixed in batcher-spreaders 9,9*a* or at a remote location and delivered through pipes or the like to be spread as layers 11,11*a*.

Figure 4:
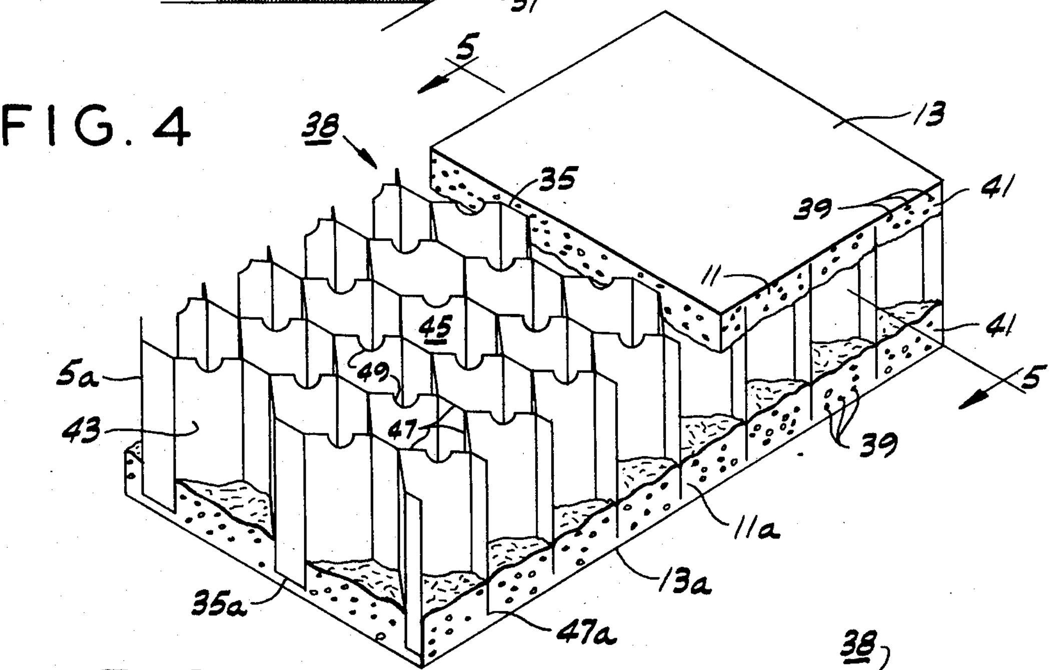
FIG. 4 is a fragmentary perspective view of a composite structural panel of this invention.
Figure 5:
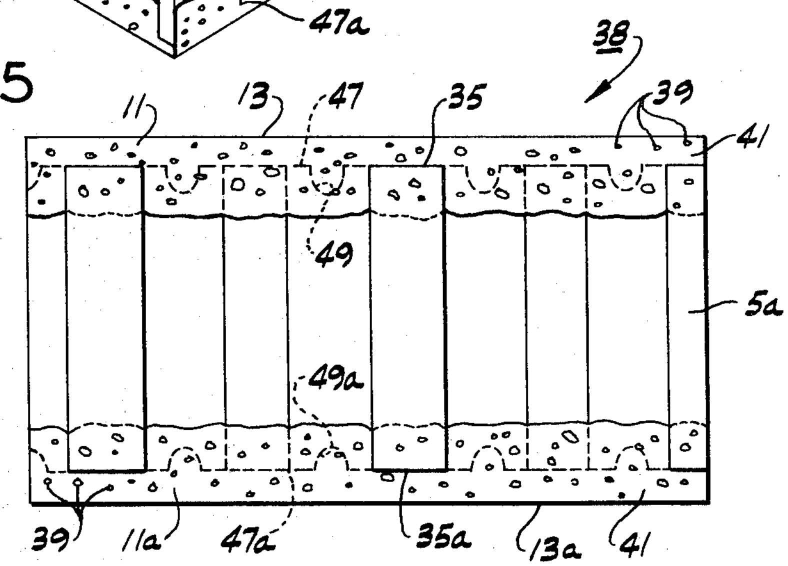
FIG. 5 is a section on line 5—5 of FIG. 4.

As shown in FIGS. 4 and 5, individual composite structural panels 38 have upper and lower layers 11,11*a* of set or dried mastic composition partially embedded in and adhered to upper and lower faces 35,35*a* of honeycomb core 5*a*, with facing material 13,13*a* adhered to the outer facing surfaces of the layers. The low-density, closed-cell, expanded synthetic resin beads, such as expanded polystyrene beads 39 of the mastic composition as previously discussed, are dispersed substantially evenly throughout the gypsum body 41 of layers 11,11*a* thereby to provide substantially imporous and homogeneous layers which, as set, are hard, strong, dimensionally stable, and heat- and sound-resistant. Paper honeycomb core 5*a* has a plurality of interconnecting walls 43 forming a plurality of individual separate cells 45, and upper and lower wall edges 47,47*a* constitute opposite core faces 35,35*a*. A plurality of openings or notches 49,49*a* are provided in edges 47,47*a* extending inwardly of walls 43 a predetermined distance, and each honeycomb cell 45 is provided with at least one upper and lower opening or notch; however, any number of upper and lower notches may be provided for each cell, as desired. It should be noted that notches 49,49*a* constitute a means for predetermining the depth of penetration of opposite core faces 35,35*a* into layers 11,11*a* and also means for predeterminately controlling thickness of layers 11,11*a* between the opposite core faces and facing material 13,13*a*. While openings 49,49*a* are shown in the drawings as notches intersecting edges 47,47*a*, it is also contemplated that other shaped openings, such as for instance round or triangular holes or elongate slots or the like, may also be employed, and it may be noted that such openings may extend through walls 43 between cells 45 of honeycomb core 5 being disposed adjacent edges 47,47*a* without intersecting with the edges. During the manufacturing process previously described, it will be recalled that mastic layers 11,11*a* are pressed into opposite core faces 35,35*a* and thus penetrate past core edges 47,47*a* into each honeycomb cell 45. When the layers penetrate into each cell 45 to the point shown in FIGS. 4 and 5, i.e., just beyond the inner ends of notches 49,49*a*, the notches are closed thereby to isolate each cell 45 from all others and trap air therein. In this manner, trapped air in each cell 45 forms a compressive cushion which opposes further penetration of layers 11,11*a* inwardly into the cells thereby to predetermine the penetration depth of the layers into each cell. It should also be noted that notches 49,49*a* while predetermining penetration depths of layers 11,11*a* also controllably predetermine the thickness of layers 11,11*a* between opposite core faces 35,35*a* and facing material 13,13*a* thereby to prevent engagement of opposite core faces with facing sheets. As the penetration depth and rate of penetration of each layer are a function of the increasing resistance of the mastic composition as it is moved against and into the cell edges, an inherent substantial self-centering of the core and equalization of layer penetration take place.

Figure 7:
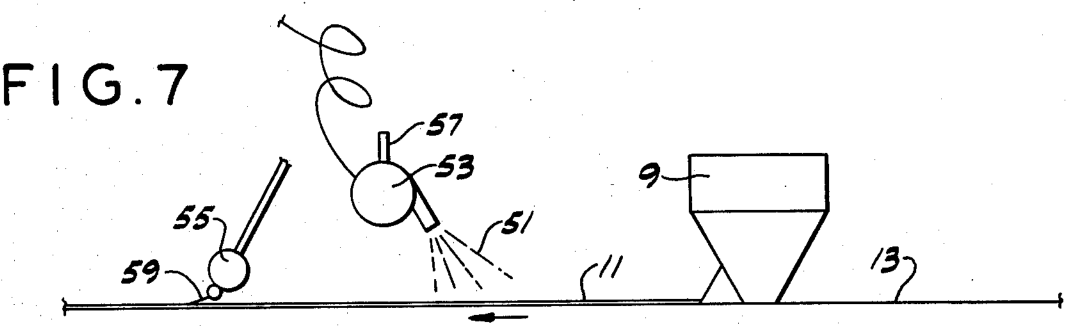
FIG. 7 is a side elevation of FIG. 6.
Figure 6:
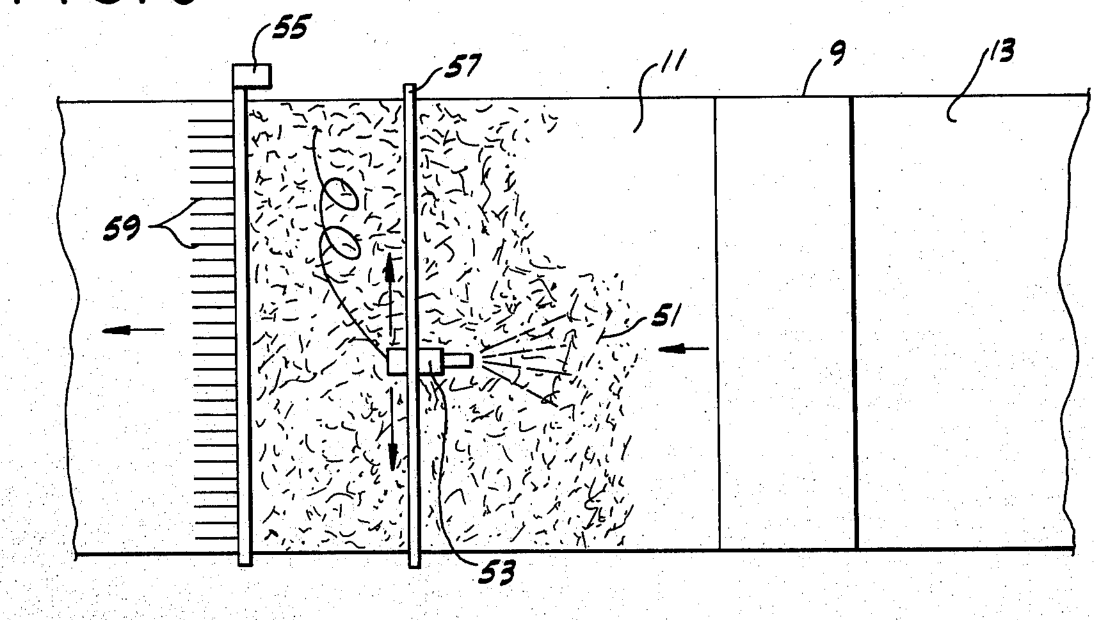
FIG. 6 is a partial plan view schematically showing additional apparatus of this invention utilized with the apparatus of FIG. 2 for spraying glass fibers on a mastic composition layer and for raking glass fibers into the layer.

In FIGS. 6 and 7, apparatus is shown which may optionally be used in conjunction with production line 1 for applying strengthening or reinforcing fibers, such as glass fibers 51, onto each mastic layer 11,11*a* and thereafter working the applied glass fibers into the mastic layers. For brevity only one such apparatus is shown but another would be used for the other mastic layer. A pair of chopper-spray guns 53 supplied with fiber glass roving are provided in production line 1 between batchers 9,9*a* and pressing rolls 17,17*a*, and a pair of vibrating rakes 55 are positioned downstream of the guns in the production line.

More particularly, guns 53 are mounted for reciprocal movement across moving mastic layers 11,11*a* and the supporting webs of facing material 13,13*a* on a pair of mounting rails 57 therefor. Glass fiber roving is continuously fed from above (not shown) to guns 53 which chop the glass fibers fed thereto into lengths of about 1 to 2 inches long and spray chopped glass fibers 51 onto the surfaces of mastic layers 11,11*a*. The reciprocal movement across mastic layers 11,11*a* on mounting rails 57 permits guns 53 to apply or distribute glass fibers substantially evenly onto the layers.

Vibrating rakes 55 extend entirely across layers 11,11*a*. Tines or teeth 59 are provided on the rakes extending generally angularly downwardly therefrom into the layers. As rakes 55 are laterally vibrated, teeth 59 work or cause penetration of at least a portion of glass fibers 51 from the top exposed surface of layers 11,11*a* downwardly into the layers.

Figure 8:
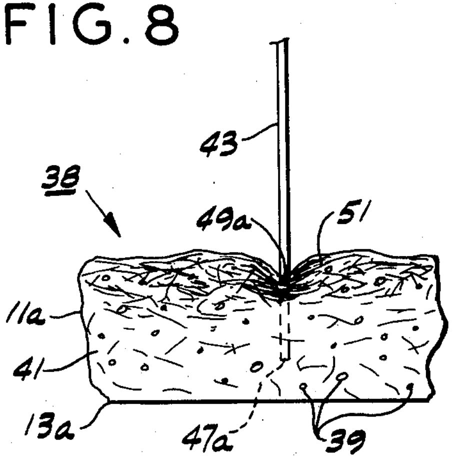
FIG. 8 is a fragmentary section of a composite structural panel of this invention wherein glass fibers are raked into the mastic composition layer.

Glass fibers 51, which are sprayed by guns 53 and penetrate into layers 11,11*a* by rakes 55, are shown in FIG. 8 as dispersed layers 11,11*a* of individual composite structural panel 38, and for brevity only the layer 11*a* is shown and discussed hereafter. It should be noted that glass fibers 51 which are sprayed and raked into layer 11*a* are more heavily concentrated adjacent the inner surface thereof than adjacent facing sheets 13*a*. The advantage of having glass fibers 51 more heavily concentrated adjacent the inner surface of layer 11*a* is that more glass fibers will extend through notches 49*a* between adjacent honeycomb cells 45 and more glass fibers will be adhered to honeycomb walls 43 and edges 47*a*. In this manner, glass fibers 51 extending through notches 49*a* between adjacent cells 45 provide reinforceement or strengthening ties between the portions of layers 11*a* which penetrate into each cell, and glass fibers adhering to honeycomb walls 43 and edges 47*a* provide a strong bond between honeycomb core 5*a* and layer 11*a*. The strengthening ties and adherence provided by glass fibers 51 are desirable not only for panel strengthening purposes but also improve fire resistance ratings as they maintain the integrity of the layer longer under flame and fire conditions.

Figure 9:
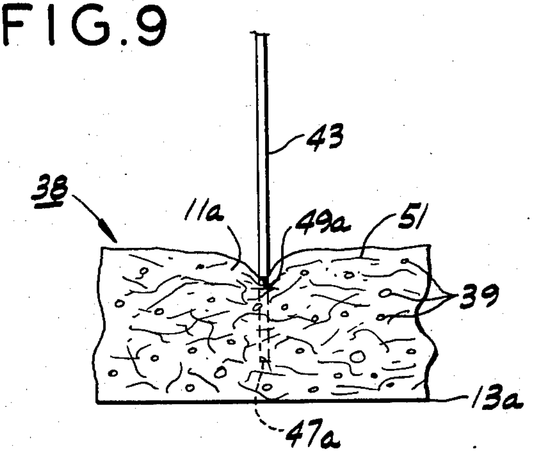
FIG. 9 is a fragmentary section of a composite structural panel of this invention showing glass fibers initially mixed with the mastic composition.

Referring now to FIG. 9, there is shown for comparison glass fibers 51 which are admixed in the expanded bead and slurry mixture, as previously discussed. It should be noted that the admixed fibers 51 are more evenly dispersed throughout layer 11*a* than those fibers of FIG. 8 which were raked into layer 11*a*. The more evenly dispersed admixed glass fibers 51 provide substantially even rather than preferential reinforcement throughout layer 11a, which may be preferred depending on the ultimate usage of the panel. Thus the intended final use of composite structural panels 38 dictates whether to spray and rake or admix fibers 51 in order to achieve the particular dispersement patterns thereof shown in FIGS. 8 and 9.

Figures 10, 11:
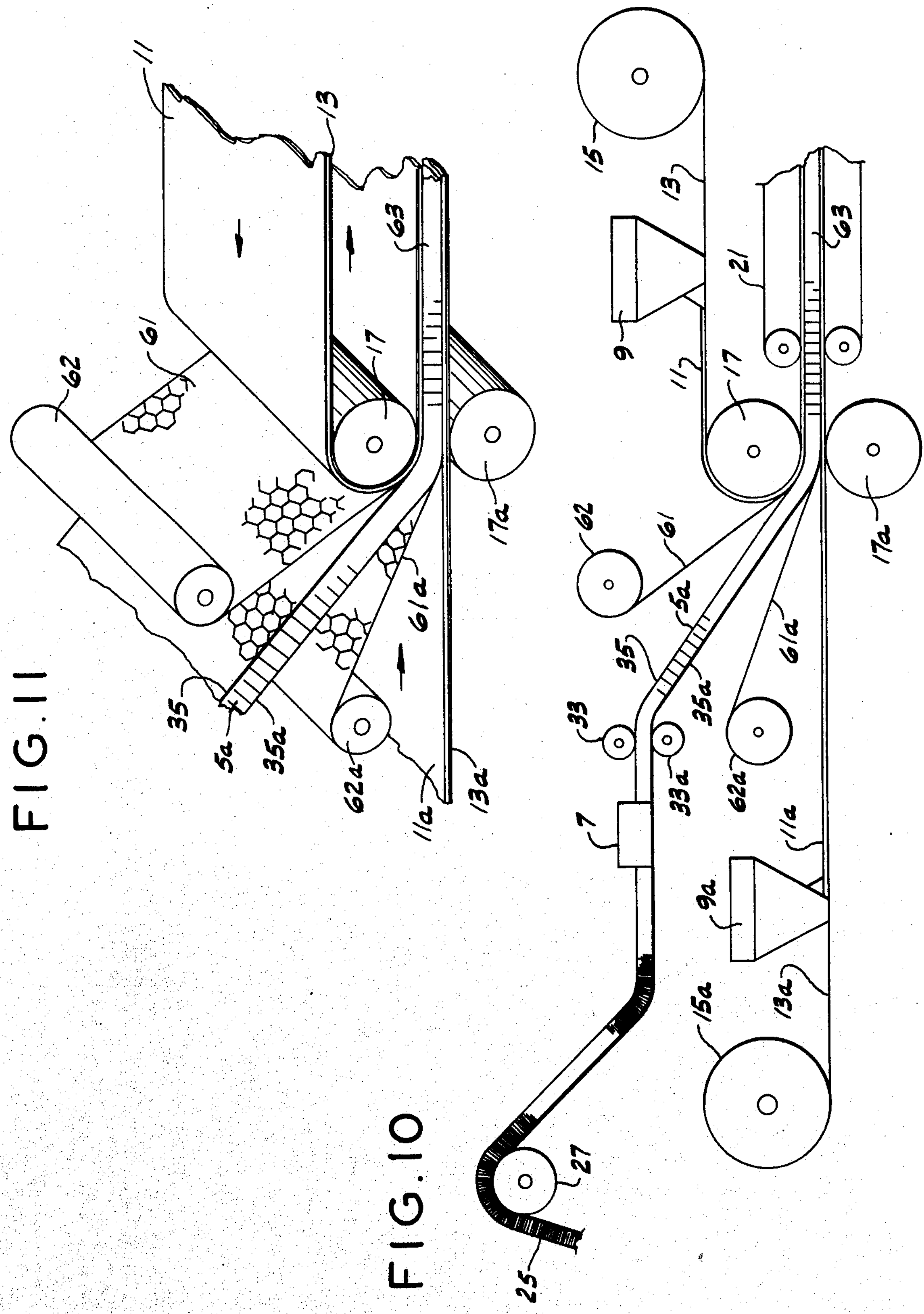
FIG. 10 is a side elevation schematically illustrating the apparatus of FIG. 2 modified to embed open mesh reinforcing material in the mastic composition layers of the structural panels being fabricated.
FIG. 11 is a fragmentary perspective view of the FIG. 10 apparatus.

Referring now to FIGS. 10 and 11, the production line 1 is shown in part and in conjunction with means for interposing open-mesh reinforcing material between facing material 13,13a and opposite faces 35,35a of honeycomb core 5a, embedded in mastic layers 11,11a.

Figure 12:
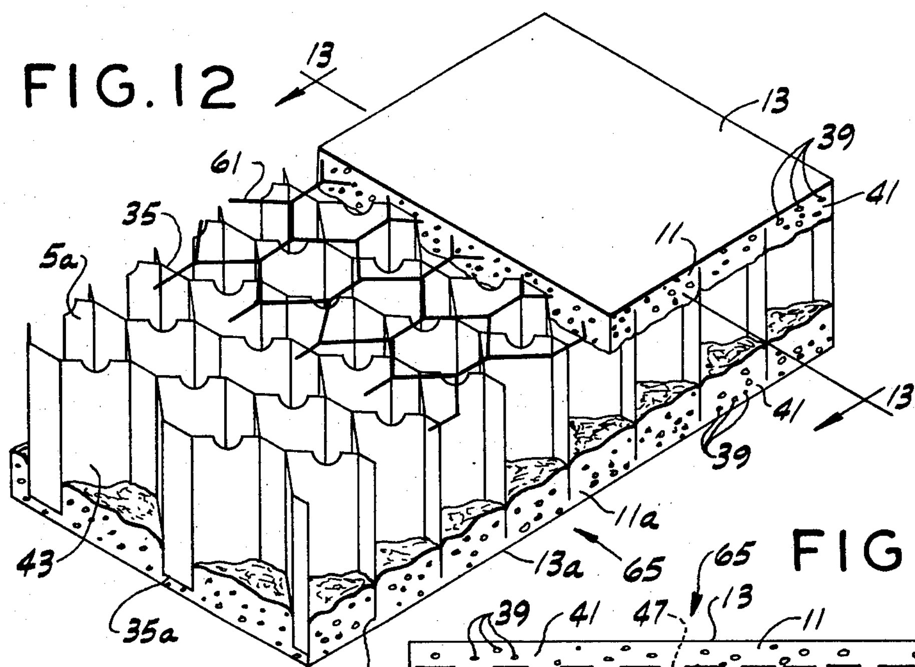
FIG. 12 is a fragmentary perspective view of a composite structural panel of this invention having reinforcing material embedded in hardened mastic composition layers thereof.
Figure 13:
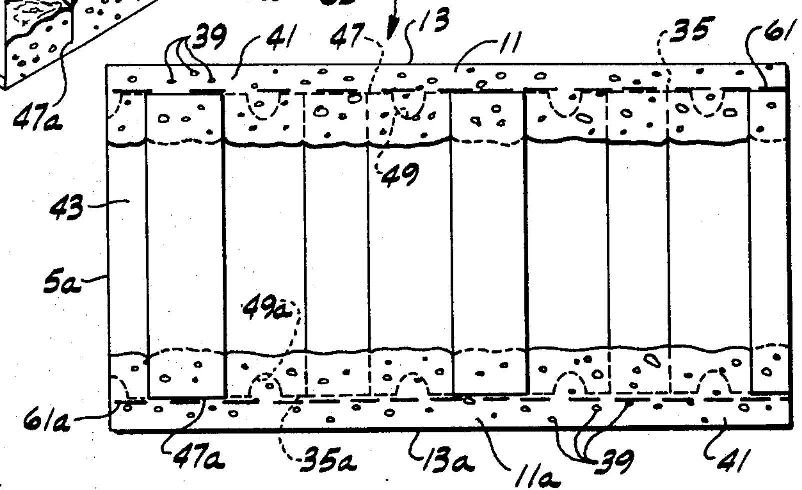
FIG. 13 is a section on line 13—13 of FIG. 12.

More particularly, upper and lower webs or layers of open wire mesh 61,61a are concertedly drawn from sources thereof, such as upper and lower supply rolls 62,62a and simultaneously fed through pressing rolls 17,17a with facing sheets 13,13a, mastic layers 11,11a and honeycomb core 5a substantially in the same manner as previously described hereinabove with respect to continuous forming of composite structural panel 19. In this instance, wire mesh 61,61a is fed between webs of facing material 13,13a and composite core faces 35,35a and becomes embedded in mastic layers 11,11a as they are pressed into engagement with opposite core faces 35,35a by pressing rolls 17,17a, as previously described, thereby to form a continuous open-mesh reinforced composite structural panel 63 which is severed into an individual composite structural panel length or segment 65 in the same manner as previously described, portions of a panel 65 being shown in FIGS. 12 and 13.

Panel 65 has all the component parts and is formed substantially in the same manner as previously discussed composite structural panel 38 with the exception that upper and lower webs of wire mesh 61,61a are embedded in upper and lower mastic layers 11,11a. The embedded wire mesh 61,61a serves to reinforce and strengthen layers 11,11a of composite structural panel 65. While metal wire mesh is particularly useful for facial reinforcement of composite structural panel 65, it is to be understood that other open mesh reinforcing material, such as made from synthetic resin or natural fibers for example, may also be used. Also, glass fibers 51 can be included in layers 11,11a with wire mesh 61,61a, and spray guns 53 and rakes 55 are compatible in the same production line 1 with wire mesh feeding rolls 62,62a. The combined use of such additional apparatus in production line 1 is also within the scope of the invention.

Figure 16:
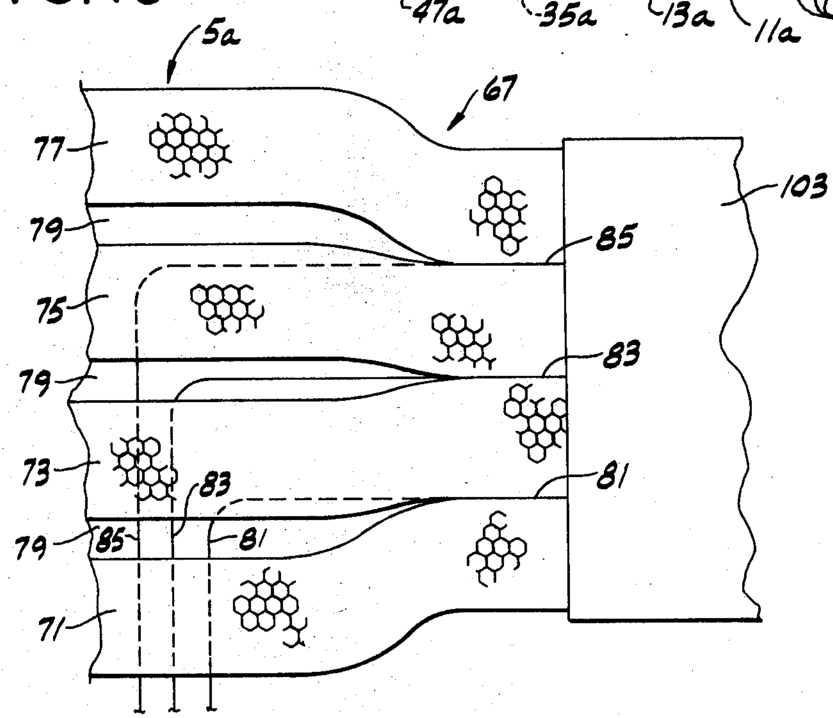
FIG. 16 is an enlarged fragmentary view taken from FIG. 15, showing the insertion of open mesh reinforcing strips between side-by-side lengths of honeycomb material.
Figures 14, 15:
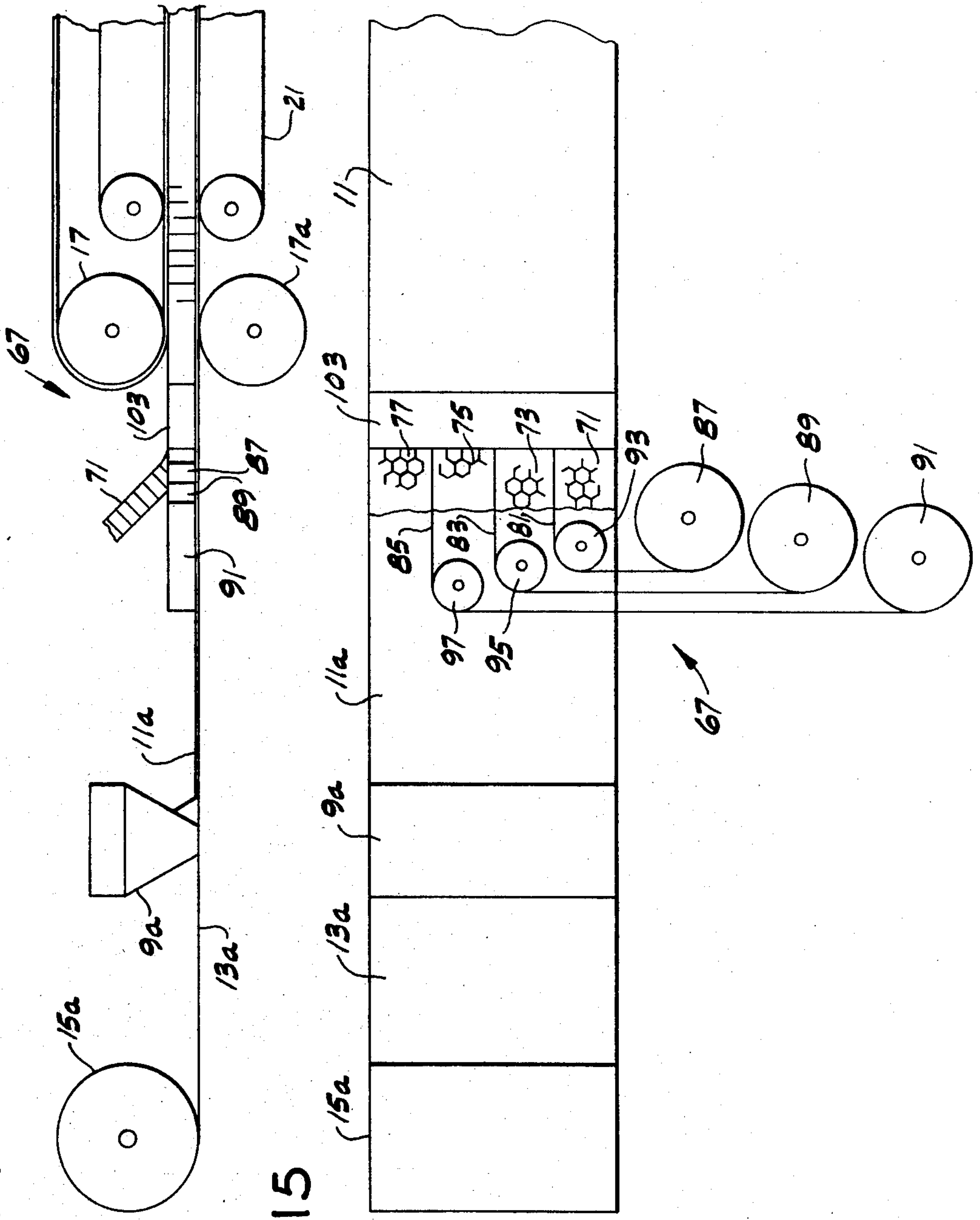
FIG. 14 is a side elevation of the apparatus of FIG. 2 modified to insert open mesh reinforcing strips between lengths of honeycomb core material and to embed the edges of these strips in the mastic composition layers.
FIG. 15 is a plan of FIG. 14.
Figure 17:
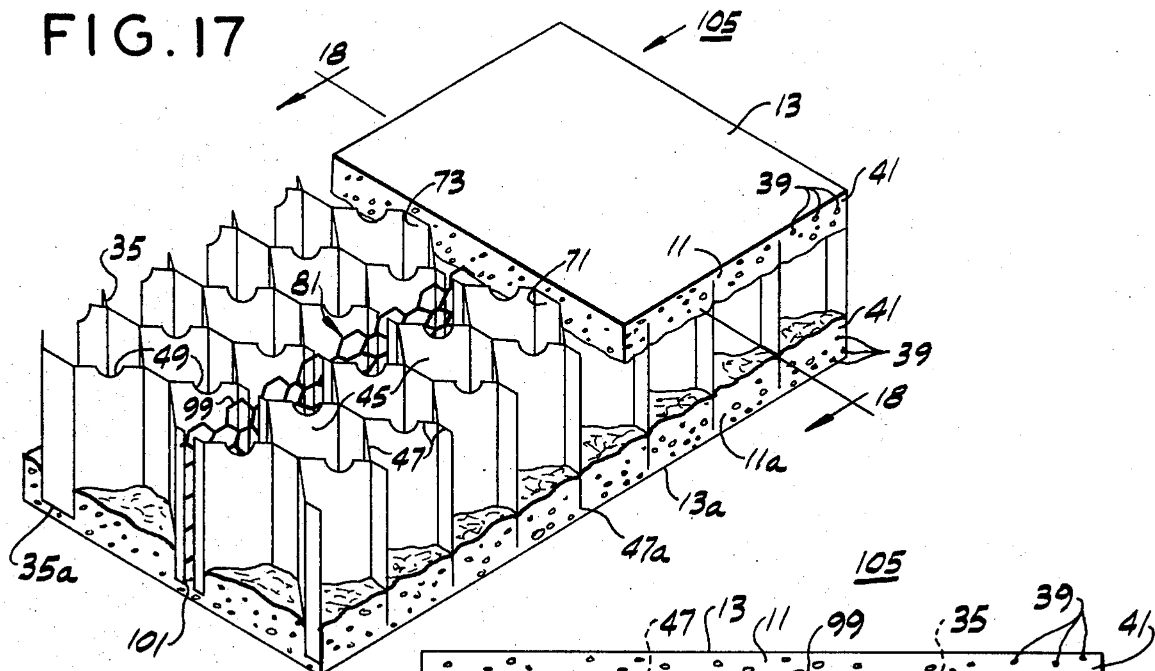
FIG. 17 is a fragmentary perspective view showing a composite structural panel of this invention with an open mesh reinforcing strip interposed between honeycomb core lengths and with the opposite edges thereof embedded in the hardened mastic composition layers.
Figure 18:
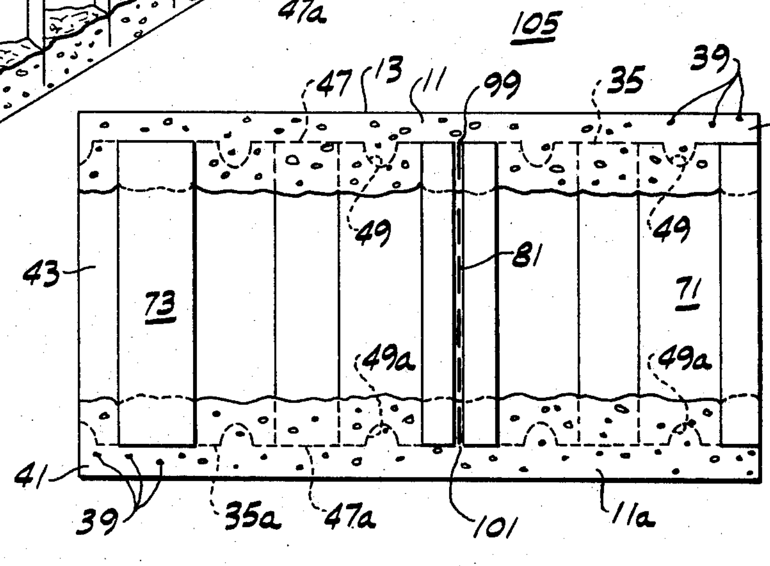
FIG. 18 is a section on line 18—18 of FIG. 17.

In FIGS. 14–16, there is shown generally at 67 apparatus which also can be added to the production line 1 thereby to merge or insert strips of open-mesh reinforcing material 81,83,85 between separate ribbons or lengths 71, 73, 75, 77 of honeycomb core material which are disposed in side-by-side relation generally having the same configuration and function as the previously described honeycomb core 5a.

More particularly, separate ribbons 71, 73, 75 and 77 of expanded honeycomb core material are fed from a source of compacted honeycomb material to pressing rolls 17,17a substantially in the same manner as previously discussed with respect to FIGS. 2 and 3. Core lengths or ribbons 71, 73, 75 and 77 are delivered in their predetermined open-cell state to the pressing rolls 17,17a substantially in side-by-side relation with each other but with lateral spaces 79 therebetween into which a plurality of strips 81, 83, 85 of open-mesh reinforcing material, such as expanded metal, are inserted or merged. Open-mesh reinforcing material of plastic or natural fibers may also be used. Sources of wire mesh strip, such as rolls 87, 89, 91 thereof, are displaced laterally of production line 1, and wire mesh strips 81, 83, 85 are drawn therefrom around a plurality of rolls 93, 95, 97 which are positioned adjacent web 13a of facing material for aligning strips 81, 83, 85 with spaces 79 provided between honeycomb lengths 71, 73, 75, 77. Strips 81, 83, 85 are each disposed in spaces 79 to extend substantially perpendicular to the opposite faces 35,35a of core lengths 71,73, and opposite edges 99,101 of the wire mesh strip are embedded in layers 11,11a substantially to the same depth of penetration as the core lengths 71,73. Wire mesh strip 81 extends in a lengthwise direction of composite structural panel 105 thereby to impart strength thereto in the lengthwise direction as well as between supporting layers 11,11a. As previously mentioned, glass fibers 51 may be incorporated in layers 11,11a if desired.

Figure 19:
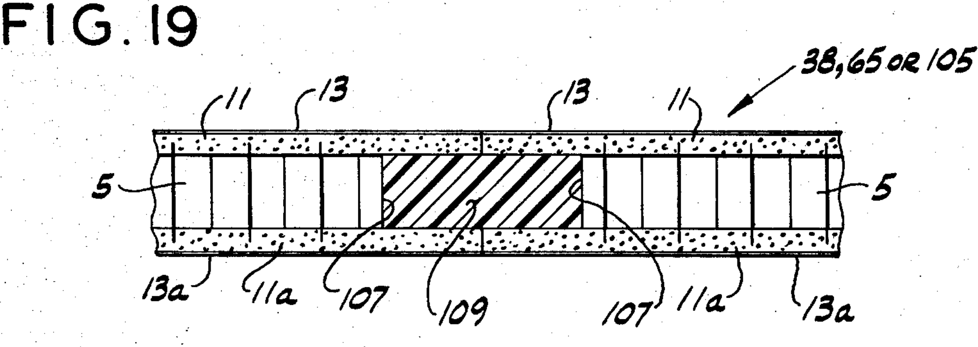
FIG. 19 is a fragmentary sectional view showing an erection tie receiving groove provided in opposite sides of a composite structural panel of this invention.

Referring now to FIG. 19, composite structural panels, such as any of the above discussed panels 38, 65 or 105, are shown in their erected positions, and a pair of mating grooves 107 is provided in the opposite sides of said panels between layers 11,11a and their facing sheets 13,13a, the grooves extending for the entire length of said panels. A tie or erection bar 109 is received in each groove 107 in order to maintain the side-by-side disposed panels in their erected positions.

From the foregoing, it will be seen that composite panels 38, 65 and 105, which include opposite facing layers 11,11a of the hardened, substantially imporous and homogeneous mastic compositions, described herein, are light in weight forming a rigid composite structure having tensile, compression and shear strengths meeting or surpassing conventional drywall. This is due in part to the strength of the honeycomb core, its low weight, the strong bond or adherence between layers 11,11a and honeycomb core 5a which is enhanced by the use of glass fibers 51 in the layers and also by the use of open-mesh reinforcing material 61,61a and 81 for reinforcing the layers, and the superior properties of layers 11,11a. When set, mastic composition layers 11,11a are dimensionally stable, resisting warping, distortion and creeping, and provide a panel of uniform thickness with a hard smooth finish with close tolerance surface flatness. The unique method of controlling embedding of layers 11,11a in the core 5a, i.e., trapping air in each honeycomb cell 45 as previously discussed, provides for a high resistance to thermal and acoustic transfer as well as absorbing and damping vibrations. With regard to thermal resistance, glass fibers 51 in layers 11,11a extending between cells 45 enhance the integrity of the layers and the panel, particularly when exposed to fire. Further, flame spread is minimized since the only exterior combustible materials are the thin paper facing material 13,13a and the material which could be consumed by fire is less than 0.1% of the panel weight.

Composite structural panels 38, 65 and 105 also have a superior resistance to weathering and ultraviolet rays and sunlight would only tend, over an extended period of time, to slightly yellow and facing surfaces of layers 11, 11a, if unpainted. Further, the composite structural panels of this inventions resist transmission of water and vapor.

Composite structural panels 38, 65 and 105 exhibit product characteristics which are extremely desirable from a structural and construction viewpoint. For instance, the composite structural panels 38, 65, 105 are capable of being continuously formed with very close thickness (±0.020 inch) and flatness tolerances (less than 0.020 inch/4 foot wide panel), and fabrication, working and machining of the panels can easily be accomplished by conventional hand or power tools since the components thereof are puncture resistant, i.e., any puncture is limited to the contact area without chipping or radical cracking.

The apparatus and methods of this invention provide fast (e.g., 5 foot/minute or 1200 sq.ft./hr.) and economical production of these composite structural panels.

In view of the above it will be seen that the several objects of the invention are achieved and other advantageous results attained.

As various changes could be made in the above methods, constructions and products without departing from the scope of the invention, it is intended that all matter contained in the above description or shown in the accompanying drawings shall be interpreted as illustrative and not in a limiting sense.

What is claimed is:

1. A composite structural panel comprising a cellular honeycomb core of thermally insulative material having opposite faces and walls between each cell, the cells extending from one face thereof to the other, the walls having opposite edges constituting the opposite faces of the core, a layer of an imporous heat and sound retardant composition on each of the opposite faces and penetrating into each cell, said composition comprising a hardened homogeneous mixture of low density closed cell expanded synthetic resin beads and a slurry prepared from calcined gypsum and water, and facing material on the outside surface of each layer, the walls having notches in the opposite edges defining openings between each cell and adjacent the opposite faces predetermining the penetration of the layers into the cells to extend into each cell just beyond the notches thereby closing the openings and trapping air in the cells to limit the penetration of the edges into the layers, controlling the thickness of the layers between the facing material and the opposite core faces and providing additional thermal and sound insulation, the layers further including reinforcing fibers which extend between adjacent cells and through the notches thereby to provide strengthening ties with the portions of the layers in adjacent cells and between adjacent cells.

2. A composite structural panel according to claim 1, wherein the core is paper.

3. A composite structural panel according to claim 1, wherein the core is asbestos.

4. A composite structural panel according to claim 1, wherein the reinforcing fibers comprise glass fibers.

5. A composite structural panel according to claim 1, comprising open mesh reinforcing material embedded in the layers and extending generally parallel to and between the facing material and the opposite core faces.

6. A composite structural panel according to claim 1, wherein the core includes lengths of cellular core material disposed substantially in side-by-side relation, and a strip of open mesh reinforcing material interposed therebetween and extending generally perpendicular to the opposite core faces, the reinforcing strip having opposite edges embedded in the layers.

7. A composite structural panel according to claim 1, comprising opposite grooves in the opposite sides of the panel between the hardened layers and adapted to receive panel erection tie strips.

* * * * *